United States Patent [19]

Sphar

[11] 4,193,457
[45] Mar. 18, 1980

[54] CUTOVER LAND RESTORER

[76] Inventor: James H. Sphar, Silver Lake, Oreg.

[21] Appl. No.: 868,972

[22] Filed: Jan. 12, 1978

[51] Int. Cl.$^2$ ............................................. A01B 29/04
[52] U.S. Cl. ...................... 172/276; 172/540;
241/101.7; 172/464
[58] Field of Search ............... 172/554, 464, 121, 27,
172/122, 276, 537, 68, 538, 277, 552, 540;
404/121, 122, 124; 241/101.7; 370/2 R, 189

[56] References Cited

U.S. PATENT DOCUMENTS

| | | | |
|---|---|---|---|
| 1,089,948 | 3/1914 | Nohr | 172/540 |
| 2,582,538 | 1/1952 | Flynn | 172/276 X |
| 2,601,751 | 7/1952 | Oakes | 172/276 |
| 2,686,997 | 8/1954 | Denton | 172/540 |
| 3,115,193 | 12/1963 | Pullen | 172/554 |
| 4,090,570 | 5/1978 | Alexander | 172/116 |

FOREIGN PATENT DOCUMENTS 210395  9/1957  Australia .................................. 172/554

*Primary Examiner*—Richard J. Johnson
*Attorney, Agent, or Firm*—Robert W. Beach

[57] ABSTRACT

Axles projecting oppositely from opposite ends of a ribbed limb-breaking roller are carried by bearings mounted on plates projecting downward from the opposite ends of a transverse beam extending across the front of a crawler tractor. Arms projecting rearwardly from opposite ends of the beam alongside opposite sides of the tractor are pivotally connected to the tractor for elevational swinging of the beam about the arm pivots to alter the elevation of the ribbed roller. The roller has six equally spaced straight cleats, each projecting radially from the roller a distance approximately equal to one-third of the roller radius and extending along substantially the full length of the roller.

2 Claims, 4 Drawing Figures

CUTOVER LAND RESTORER

BACKGROUND OF THE INVENTION

1. Field of the Invention

The present invention relates to cutover land restorers operating to flatten slash for reducing fire hazard and facilitating production of mulch for facilitating reforestation.

2. Prior Art

Road rollers such as steamrollers have wide, heavy, smooth rollers for compacting generally even surfaces. Sheepsfoot rollers have spikes or pegs projecting from the roller periphery to perforate or scarify the surface being rolled and effect greater compaction than road rollers. Floats have been used for dressing, finishing or smoothing surfaces. One type of float includes a platform of heavy, overlapping planks cleated together that is drawn over soil to smooth its surface, to improve its condition or to crush clods.

SUMMARY OF THE INVENTION

It is an object of the present invention to restore cutover land by flattening slash, to facilitate the production of mulch, and by stirring the soil gently and aerating it, rather than compacting it on the one hand or digging, turning or cultivating it on the other hand.

In restoring cutover land, it is an object to be able to vary the pressure exerted on the ground depending upon its hardness or nature, and the amount and nature of slash present on it.

It is also an object to provide a land restorer in the form of a power machine that can be driven over cutover land, maneuvered readily and turned sharply without churning the soil appreciably at the location of the turn.

Still another object is to provide a cutover land restorer that can be attached to a conventional tractor as an accessory.

The foregoing objects can be accomplished by an attachment for a crawler tractor in the form of a ribbed idler roller that can flatten slash and prepare it for composting with minimum compaction of the soil.

DETAILED DESCRIPTION

In many cases, the best use of cutover land is for reforestation. In order to provide the best environment for reforestation with the least work and expense, it is desirable to have cleared soil that is prepared for tree growth. Much labor and expense is involved in clearing and burning slash, and such disposal of slash deprives the land to be reforested of slash mulch. If the slash is not cleared, however, the land is rough with branches making it difficult to work on reforestation. Further, many branches are tangled above the ground and make effective fuel for slash fires that could destroy reforestation seedlings.

If the slash is simply burned, rather than being cleared first, before reforestation is undertaken, the soil again is deprived of natural mulch which could be formed by the burned branches. Also, dried leaves, bark, chips, sawdust and peat that could form nutritive mulch are destroyed so as to hamper seedling growth for several years. The objective of the present invention is to provide a cutover land restorer that will flatten slash, particularly branches and bark, will press such flattened slash lightly into contact with the ground to promote composting and will neither compact the soil excessively nor churn it sufficiently to disturb the natural condition of the soil most conducive to reforestation.

The cutover land restorer is provided as an accessory or an attachment for a crawler tractor 1 carried and propelled by cleated endless treads 2. Such a crawler tractor is commonly used in a bulldozer by supporting a bulldozer blade on the cross member of a U-shaped frame 3 having arms embracing the front of the tractor. The rearward ends of the arms are pivotally connected to the tractor, so that the U-shaped frame can be adjusted elevationally, such as by hydraulic jacks 4 shown in FIGS. 1, 2 and 3.

Figure 1:
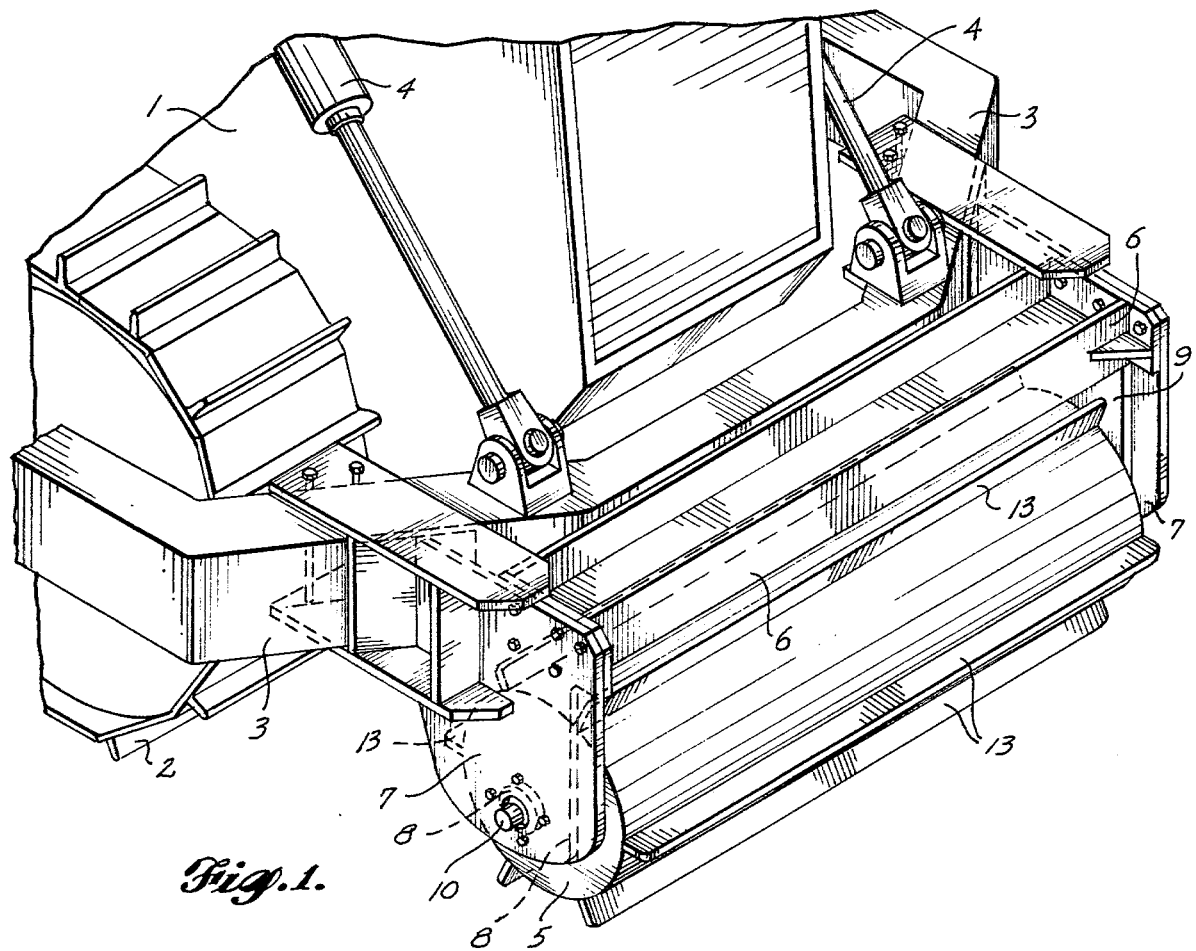
FIG. 1 is a top perspective of a land restorer attachment according to the present invention mounted ahead of a crawler tractor.

The major component of the cutover land restorer of the present invention is a ribbed roller 5 rotatively supported from a transverse beam 6. Such beam is detachably mounted on the cross member of the U-shaped frame 3 as shown in FIG. 1. The roller is supported from the transverse beam by end mounting plates 7 depending from respective opposite end portions of beam 6. The roller is an idler roller preferably supported for easy rotation by antifriction bearings 8. Each bearing is fitted in a socket aperture in an inner plate 9 attached in face-to-face relationship with an outer end plate 7, such as by being bolted to it as shown in FIG. 4.

Figure 4:
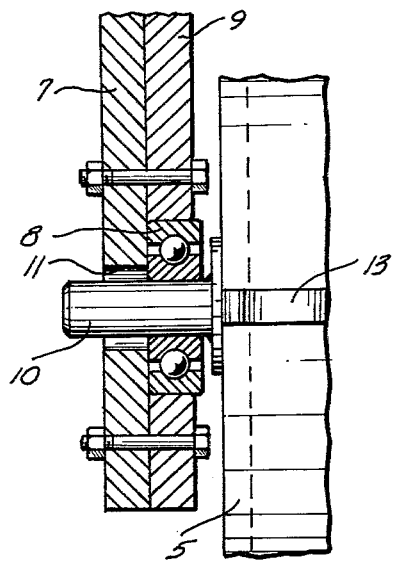
FIG. 4 is an enlarged detail front elevation of a portion of the land restorer ribbed roller showing the axial mounting with parts broken away.

An axle 10 projects axially from each end of roller 5, fits in the inner race of a bearing 8 and projects beyond it into or through an aperture 11 in end plate 7, as shown best in FIGS. 1 and 4. The circumference 12 of the roller shell is made of plate material, as indicated in FIG. 2, and carries cleats 13 extending lengthwise of the roller and preferably having their inner edges welded to the roller periphery.

Figure 2:
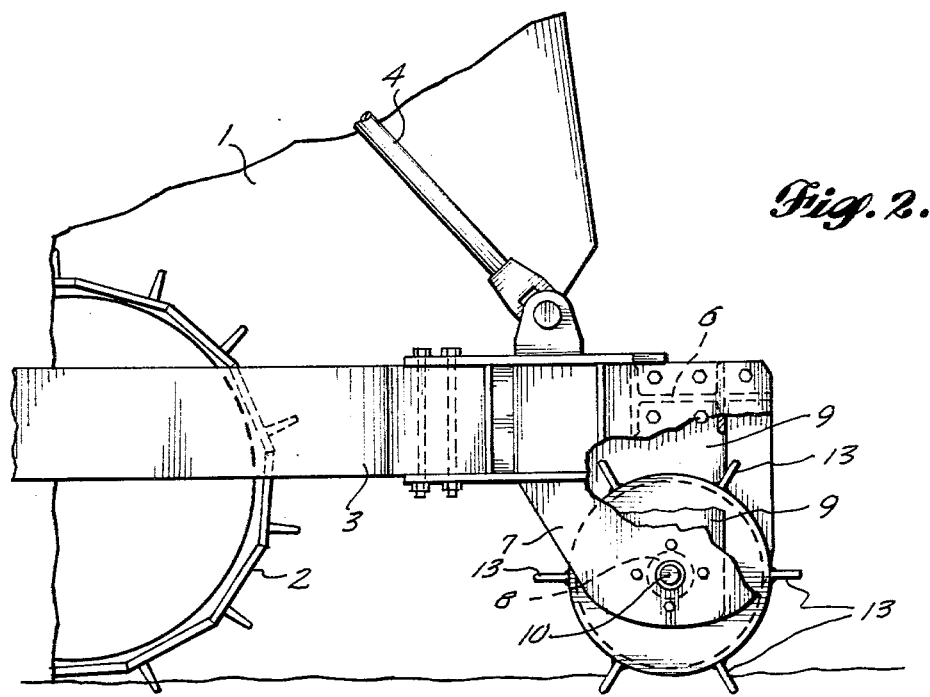
FIG. 2 is a side elevation of such land restorer attachment mounted on a tractor with parts broken away.
Figure 3:
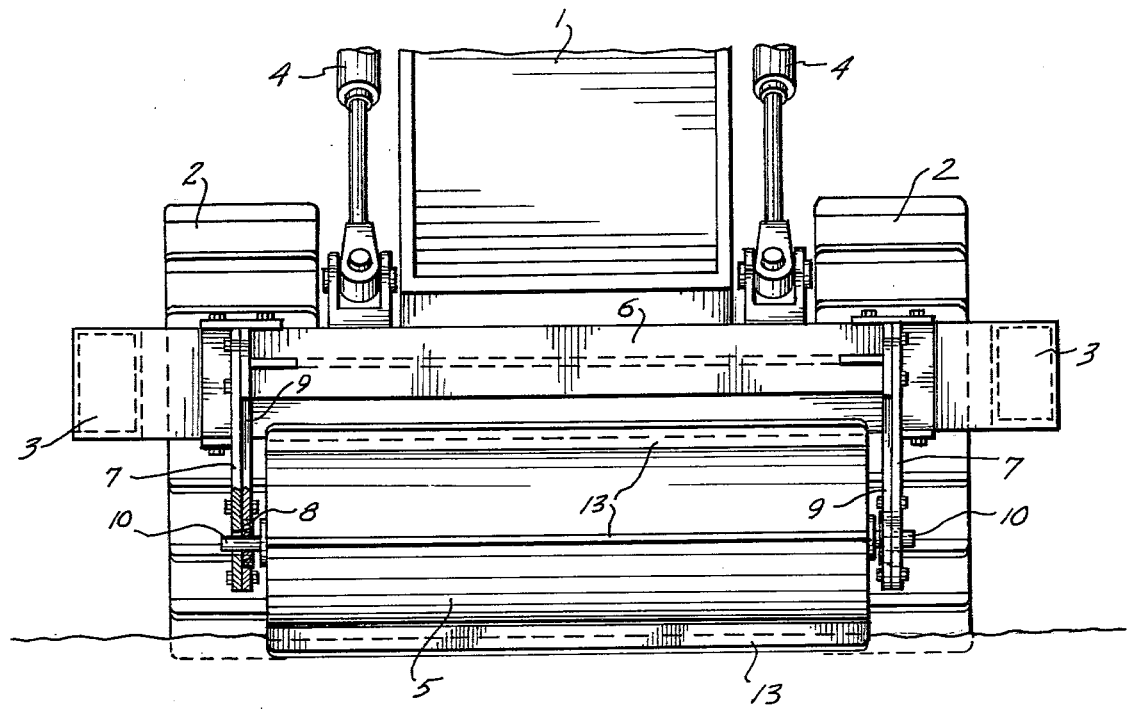
FIG. 3 is a front elevation of the land restorer attachment having parts broken away.

As seen best in FIG. 2, cleats or ribs 13 have a radial extent exceeding their circumferential extent, preferably being several times as wide radially as they are thick circumferentially. Moreover, the projection of such ribs radially beyond the roller circumference may be approximately one-third of the roller radius. Thus if the radius of the roller is twelve inches, the width of each cleat may be approximately four inches, or if the radius of the roller is fifteen inches, the width of a cleat may be five inches. It is preferred that the diameter of the roller be between eighteen inches and thirty-six inches.

The action of the land restorer is to travel over cutover land with the idling ribbed roller rolling freely over slash such as bark, chips, branches and leaves strewn on the ground. Because the roller is not driven but simply idles and rolls along the ground, it does not tend to displace slash or churn the ground. Instead, cleats 13 exert local pressure on small branches, twigs and bark to break them into reasonably short pieces, such as corresponding to the circumferential spacing of the cleats, and to at least crack larger branches. The circumferential spacing of the cleats should correspond generally to the lengths of flattened slash pieces desired to be produced in the land restoring operation.

The ribbed roller should have several cleats, six cleats 13 being shown in FIG. 2. If six cleats are provided, equally spaced around the circumference of the roller, they will be spaced apart a distance approximately equal to the radius of the roller. Thus if the roller has a radius of twelve inches, the cleats will be spaced apart about twelve inches that is, a plurality of times, such as three times, the radial extent of the cleats. For larger rollers it may be desirable to provide more cleats. The radial extent or width of the cleats depends upon the general type and size of slash pieces to be flattened by the land restorer.

As the land restorer travels over cutover land, the ribbed roller 5 will roll on tangles of branches or bowed branches in its path to break or crack such branches depending upon how dry and big they are. The cleats will penetrate the surface of the soil to some extent to press wood chunks, bark, chips and pieces of branches gently into the soil so that the hazard of a slash fire is reduced. In addition, composting of slash is promoted by ground contact. Jacks 4 can be adjusted to exert sufficient pressure on frame 3 so that the ribbed roller does an effective job of reducing the debris to small pieces and presses it lightly into the soil, but the pressure is not so great that the roller compacts the soil substantially. Instead, movement of the cleats into the soil should stir it gently and aerate it, not dig it, turn it or cultivate it for most effectively promoting seedling growth by providing a natural mulch and a natural protective cover for the soil that will absorb and hold moisture.

As evident from FIG. 2, cleats 13 do not penetrate deeply into the soil as roller 5 turns, so that the penetration of the cleats into the ground will not deter turning of the tractor appreciably, nor will the cleats churn the soil undesirably during a turning maneuver. If preferred, jacks 4 can be retracted to elevate the roller unit while the tractor is turning.

The transverse beam 6 can be unbolted easily from the frame 3 to be replaced by a bulldozer blade. The roller attachment is quite light and can be transported conveniently. The roller is of simple and rugged construction, and its antifriction mounting bearings are protected from injury by being mounted inwardly of the end plates 7. Nevertheless, the bearings can be removed easily from the roller by unbolting the end plates 7 from the end of the transverse beam 6 so as to afford ready access to the bearings for lubrication, repair or replacement.

While, as stated above, it is preferred that the roller 5 be of the idler type, it could be powered, if desired, by being attached to a power takeoff from the tractor engine.

I claim:

1. A cutover land restorer comprising a crawler tractor, an axially elongated roller having elongated slash-breaking cleats arranged with their lengths extending longitudinally of said roller, each cleat projecting outwardly from the circumference of said roller a distance approximately equal to one-third of the roller radius and the radius of said roller is between nine inches and eighteen inches, said roller having a circumferential wall extending between circumferentially adjacent cleats, and means for mounting said roller on said tractor for rotation about a horizontal axis extending transversely of said tractor with said cleats consecutively engaging the ground approximately on the same level as the tracks of said crawler tractor, and said mounting means being operable to press said roller against the ground, the circumferential spacing between adjacent cleats being a plurality of times as great as the radial width of said cleats for rolling said circumferential wall of said roller between said cleats on the ground.

2. A cutover land restorer comprising a crawler tractor, an axially elongated roller having elongated slash-breaking cleats arranged with their lengths extending longitudinally of said roller, means for mounting said roller on said crawler tractor including a U-shaped support supporting said roller and having arms extending rearwardly alongside said tractor with their rearward ends pivotally connected to said tractor for elevational adjustment of said roller by swinging of said arms about their pivotal connections to said tractor so that the lower periphery of said roller can be disposed approximately on the same level as the tracks of said crawler tractor for rolling on the ground, the spacing of adjacent cleats circumferentially of said roller being a plurality of times as great as the projection of said cleats outward from the surface of said roller to enable the circumferential surface of said roller between said cleats to roll on the ground.

* * * * *